July 6, 1943.    W. McARTHUR    2,323,829
METAL FURNITURE
Filed April 22, 1942
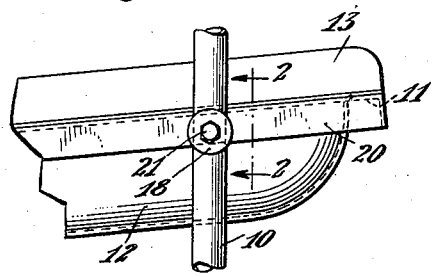
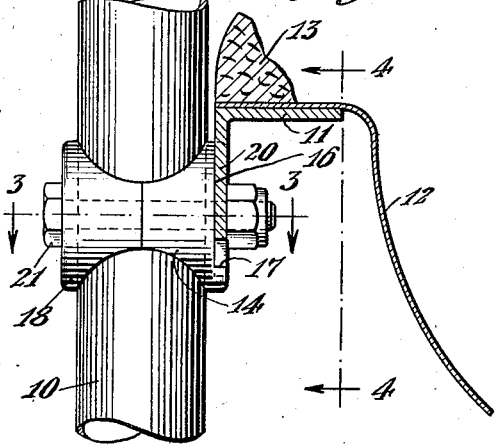
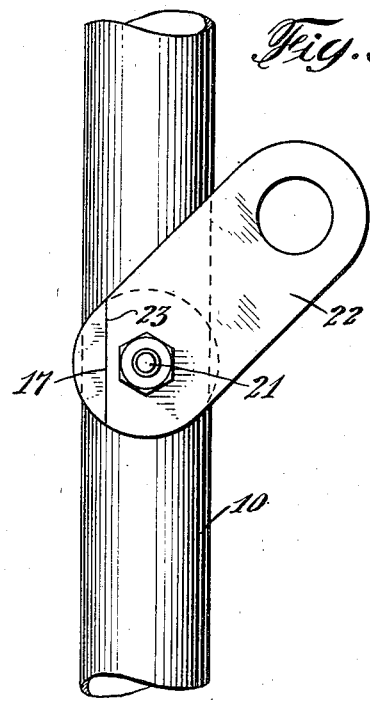
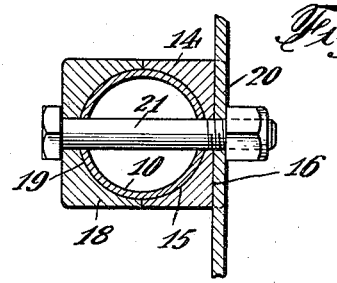
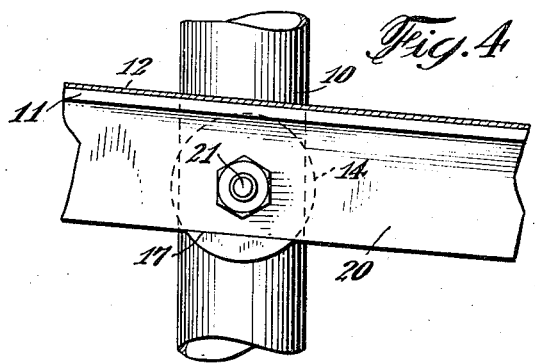
INVENTOR
Warren McArthur
BY
Bromley Seeley
ATTORNEY Patented July 6, 1943

2,323,829

UNITED STATES PATENT OFFICE 2,323,829

METAL FURNITURE

Warren McArthur, New York, N. Y., assignor to Warren McArthur Corporation, a corporation of New York Application April 22, 1942, Serial No. 439,983

5 Claims. (Cl. 287—54)

This invention relates to metal furniture and more particularly to an improved construction of joint between frame members or the like having different cross sectional configurations.

In the manufacture of light weight metal furniture, tubular frame members formed, for example, from relatively light gauge aluminum tubing are largely employed. At the same time, other structural members in the shape of angles, sheets, bars or the like are also used and it is necessary to connect together these members of different shape with a suitable joint.

An object of this invention is to provide an improved construction for metal furniture arranged to connect together frame members of different cross sectional configurations, while providing a finished, attractive appearance.

A further object is to provide an improved connecting member for use in securing together frame members of different cross sectional configurations.

These and other objects which will be apparent to those skilled in the art are accomplished by this invention, one embodiment of which is illustrated in the accompanying drawing, in which, Fig. 1 is an elevation of part of a seat assembly showing a joint between a side frame member of rod shape and a seat frame member of angle form, constructed in accordance with one embodiment of this invention, Fig. 2 is a partial section on the line 2—2 of Fig. 1, showing the seat frame in section, Fig. 3 is a section on the line 3—3 of Fig. 2, Fig. 4 is a section on the line 4—4 of Fig. 2, and Fig. 5 is a view similar to Fig. 4, showing the invention as employed in connecting a flat bracket arm or the like to a tubular frame member.

As illustrated in Figs. 1 to 4, the invention is shown as employed in securing an angle bar, forming part of a seat frame to a supporting tubular frame member, but it will be apparent that the invention is equally well adapted to frame members having other specific forms or shapes.

As illustrated, a tubular frame member 10 is connected to and supports an angle bar 11 which may, for example, support a seat pan 12 and cushion 13.

A washer or connecting member 14 has a concave face 15 on one side shaped to conform to and snugly engage the outer surface of the tubular frame member 10. On the other side the connecting member has a flat face 16 provided with a shoulder 17 extending along one side thereof. Usually, a clamping collar 18 having a concave face 19 engages the tubular frame member which is clamped between the collar and the washer or connecting member 14, but it will be apparent that the collar is not essential to the present invention except to provide a finished appearance.

One flange 20 of the bar 11 engages the flat face 16 of the connecting member with the edge of the bar engaging the shoulder 17 by which the angle is held in predetermined position with relation to the tubular frame member. A single clamping bolt 21 extends through the flange 20, connecting member 14, tubular frame member 10 and clamping collar 18 and holds the entire assembly together in a rigid construction. When the clamping collar 18 is provided it will be apparent that it cooperates with the connecting member 14 in preventing the clamping pressure from collapsing the wall of the light gauge tubular frame member.

Fig. 5 shows the invention employed in securing a flat bracket arm or similar member 22 to the tubular member in predetermined angular relationship. The bracket arm has a straight edge 23 adapted to engage the shoulder 17 on the connecting member to position the bracket arm in predetermined relationship to the tubular frame member.

It will be apparent that the present invention is independent of the particular shape of frame member employed and is equally well adapted to other shapes than those illustrated. Obviously, the invention can be variously modified and adapted within the scope of the appended claims.

I claim:

1. The combination in an article of furniture, of a rod-shaped frame member, a second frame member, means for securing said frame members together comprising a connecting member having a concave face on one side conforming to and engaging said rod-shaped member, and a flat, shouldered face on the other side engaging said second frame member with the shoulder thereof engaging an edge of said second frame member, and means extending through said frame members and said connecting member for clamping said members together.

2. The combination in an article of furniture, of a rod-shaped frame member, a second frame member of angular cross-section, means for securing said frame members together comprising an intermediate connecting member having a concave face on one side engaging said rod-shaped member, and a shouldered face on the other side engaging said second frame member with the shoulder thereof in engagement with an edge of said second frame member to position said second frame member in predetermined relation to said rod-shaped member, and means extending through said frame members and said connecting member for clamping said members together.

3. The combination in an article of furniture, of a tubular frame member, an angle bar forming a second frame member, means for securing said frame members together comprising a connecting member having a semi-cylindrical concave face on one side conforming to and engaging said tubular member, and a flat face on the other side engaging one flange of said angle bar, a shoulder on said connecting member extending along said flat face and engaging the edge of said flange to position said angle bar in predetermined relation to said tubular frame member, and means extending through said frame members and said connecting member for clamping said members together.

4. The combination in an article of furniture, of a tubular frame member, an angle bar forming a second frame member, means for securing said frame members together comprising a connecting member having a semi-cylindrical concave face on one side conforming to and engaging said tubular member, and a flat face on the other side engaging one flange of said angle bar, a shoulder on said connecting member extending along said flat face and engaging the edge of said flange to position said angle bar in predetermined relation to said tubular frame member, a clamping collar cooperating with said connecting member to surround said tubular member, and means extending through said frame members, said connecting member and said collar for clamping said members and collar together.

5. The combination in an article of furniture, of a tubular frame member, an angle bar forming a second frame member, means for securing said frame members together comprising a connecting member having a semi-cylindrical concave face on one side conforming to and engaging said tubular member, and a flat face on the other side engaging one flange of said angle bar, a shoulder on said connecting member extending along said flat face, a shoulder-engaging edge on said flange adapted to position said angle bar in predetermined relation to said tubular frame member when in engagement with said shoulder, and means extending through said frame members and said connecting member for clamping said members together.

WARREN McARTHUR.